US009288240B2

(12) United States Patent
Sylvain

(10) Patent No.: US 9,288,240 B2
(45) **Date of Patent: *Mar. 15, 2016**

(54) SYSTEM AND METHOD FOR ALLOWING AN ORIGINATING USER DEVICE TO USE CONTACT INFORMATION IN A PRIORITIZED LIST TO CONTACT A DESTINATION USER DEVICE

(71) Applicant: Apple Inc., Cupertino, CA (US)

(72) Inventor: Dany Sylvain, Quebec (CA)

(73) Assignee: Apple Inc., Cupertino, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/077,587

(22) Filed: Nov. 12, 2013

(65) Prior Publication Data

US 2014/0071858 A1 Mar. 13, 2014

Related U.S. Application Data

(63) Continuation of application No. 10/723,978, filed on Nov. 26, 2003, now Pat. No. 8,612,522.

(51) Int. Cl.

| | |
|---|---|
| ***G06F 3/048*** | (2013.01) |
| ***G06F 15/16*** | (2006.01) |
| ***H04L 12/66*** | (2006.01) |
| ***H04L 29/06*** | (2006.01) |
| ***H04L 29/08*** | (2006.01) |

(Continued)

(52) U.S. Cl.

CPC ............ *H04L 65/40* (2013.01); *H04L 12/6418* (2013.01); *H04L 67/24* (2013.01); *H04L 67/306* (2013.01); *H04M 3/436* (2013.01); *H04W 8/18* (2013.01); *H04M 3/42059* (2013.01); *H04M 3/4931* (2013.01)

(58) Field of Classification Search

CPC ..... H04L 65/40; H04L 12/6418; H04L 67/24; H04L 37/306; H04M 3/436; H04M 3/4931; H04M 3/42059; H04W 8/18

USPC .................... 709/206, 207; 370/252; 715/811

See application file for complete search history.

(56) References Cited

U.S. PATENT DOCUMENTS 5,694,616 A 12/1997 Johnson et al.
5,999,611 A 12/1999 Tatchell et al.

(Continued)

OTHER PUBLICATIONS

U.S. Appl. No. 10/723,978, Dany Sylvain, filed Nov. 26, 2003.

*Primary Examiner* — Daniel C Murray

(74) *Attorney, Agent, or Firm* — Meyertons, Hood, Kivlin, Kowert & Goetzel, P.C.

(57) ABSTRACT

The present invention provides an originating user with a prioritized list of communication contacts associated with the various communication devices of a destination user, wherein the originating user will initiate communications with the destination user using one of the communication contacts provided in the prioritized list. Upon selecting a destination user, a request is sent to a service node, which includes rules for establishing the prioritized list based on various prioritization criteria. The prioritization criteria may include static information and dynamic information, such as time, day of the week, and date, as well as presence information bearing on the availability or location of the destination user. Information may be provided in the request corresponding to the originating user, the type of communication desired by the originating user, the relative priority of the communication, among other information, which may be used to create the prioritized list.

20 Claims, 4 Drawing Sheets

ORIGINATION MULTIMEDIA CLIENT 36
SERVICE NODE 48A
MULTIMEDIA CLIENT DATABASE 50
SERVICE NODE 48B
FORWARD CONTACT INFO. REQUEST 120
DETERMINE CONTACT LIST FOR DESTINATION USER 122
PRIORITIZED LIST OF COMMUNICATION CONTACTS 124
PRIORITIZED LIST OF COMMUNICATION CONTACTS 126
DISPLAY PRIORITIZED LIST OF COMMUNICATION CONTACTS 128
CONTACT SELECTION 130
COMMUNICATION REQUEST FOR SELECTED CONTACT 132
INITIATE COMMUNICATION 134
INITIATE COMMUNICATION 136

(51) Int. Cl.

| | |
|---|---|
| ***H04W 8/18*** | (2009.01) |
| ***H04M 3/436*** | (2006.01) |
| ***H04L 12/64*** | (2006.01) |
| *H04M 3/493* | (2006.01) |
| *H04M 3/42* | (2006.01) |

(56) References Cited

U.S. PATENT DOCUMENTS 6,243,398 B1 * 6/2001 Kahane et al. ................ 370/522
6,301,609 B1 10/2001 Aravamudan et al.
6,430,289 B1 * 8/2002 Liffick .......................... 370/352
6,463,471 B1 10/2002 Dreke et al.
6,711,158 B1 3/2004 Kahane et al.
6,832,245 B1 12/2004 Isaacs et al.
6,968,052 B2 11/2005 Wullert, II
6,970,547 B2 11/2005 Andrews et al.
6,973,299 B2 12/2005 Apfel
7,035,923 B1 * 4/2006 Yoakum et al. ............... 709/224
7,139,555 B2 11/2006 Apfel
7,139,797 B1 * 11/2006 Yoakum et al. ............... 709/204
7,139,806 B2 * 11/2006 Hayes .................. G06Q 10/107 709/200
7,162,474 B1 1/2007 Harker et al.
7,174,305 B2 * 2/2007 Carruthers ............. G06Q 30/02 705/14.52
7,200,638 B2 4/2007 Lake
7,242,927 B2 7/2007 Anderson
7,251,696 B1 7/2007 Horvitz
7,284,002 B2 10/2007 Doss et al.
7,675,903 B2 3/2010 Ozugur et al.
7,725,541 B2 * 5/2010 Daniell et al. ................ 709/206
7,831,675 B2 * 11/2010 Narayanaswami et al. .... 709/206
8,009,678 B2 * 8/2011 Brooke .................... 370/395.42
8,065,369 B2 * 11/2011 Turski et al. .................. 709/206
8,095,603 B2 * 1/2012 Hung et al. ................... 709/206
8,140,633 B2 * 3/2012 Daniell et al. ................ 709/206
8,577,895 B2 * 11/2013 Gupta et al. .................. 707/748
8,832,190 B1 * 9/2014 Leske et al. ................... 709/204
8,880,730 B2 * 11/2014 Hebert et al. ................. 709/245
9,037,602 B2 * 5/2015 Gamaley ................ G06Q 10/10 707/769
9,043,431 B2 * 5/2015 Chappell ............. G06Q 10/109 709/217
2001/0026223 A1 10/2001 Menard et al.
2002/0024947 A1 * 2/2002 Luzzatti et al. ............... 370/352
2002/0080413 A1 6/2002 Sommerer
2002/0097856 A1 7/2002 Wullert, II
2002/0116461 A1 8/2002 Diacakis et al.
2002/0128904 A1 * 9/2002 Carruthers ............. G06Q 30/02 705/14.43
2003/0158855 A1 8/2003 Farnham et al.
2004/0056901 A1 3/2004 March et al.
2004/0073643 A1 * 4/2004 Hayes .................. G06Q 10/107 709/223
2004/0158609 A1 * 8/2004 Daniell et al. ................ 709/206
2004/0248597 A1 12/2004 Mathis
2005/0027716 A1 * 2/2005 Apfel ............................ 707/100
2005/0038856 A1 2/2005 Krishnasamy et al.
2005/0041793 A1 2/2005 Fulton et al.
2005/0091272 A1 4/2005 Smith et al.
2005/0141479 A1 * 6/2005 Ozugur et al. ................ 370/351
2005/0175021 A1 8/2005 Ozugur et al.
2005/0198172 A1 9/2005 Appelman et al.
2005/0204007 A1 9/2005 McGregor et al.
2005/0288006 A1 12/2005 Apfel
2006/0036703 A1 * 2/2006 Fulmer et al. ................. 709/207
2006/0173961 A1 * 8/2006 Turski et al. .................. 709/206
2006/0209690 A1 * 9/2006 Brooke ......................... 370/230
2007/0253340 A1 * 11/2007 Varney et al. ................. 370/252
2008/0133580 A1 6/2008 Wanless et al.
2008/0147639 A1 6/2008 Hartman et al.
2008/0201419 A1 * 8/2008 Hung et al. ................... 709/204
2008/0201435 A1 * 8/2008 Dubovsky et al. ............ 709/206
2009/0150441 A1 * 6/2009 Johnsen ................. G06Q 10/10
2009/0187630 A1 * 7/2009 Narayanaswami et al. ... 709/206
2010/0175000 A1 * 7/2010 Gupta et al. .................. 715/753
2010/0184416 A1 * 7/2010 Gupta .................... G06Q 10/10 455/414.3
2010/0191820 A1 * 7/2010 Daniell et al. ................ 709/206
2010/0299396 A1 * 11/2010 Memon et al. ................ 709/206
2011/0231407 A1 * 9/2011 Gupta et al. .................. 707/748
2012/0079016 A1 * 3/2012 Hung et al. ................... 709/203
2015/0200878 A1 * 7/2015 Shih ...................... H04L 51/046 709/206

* cited by examiner

SYSTEM AND METHOD FOR ALLOWING AN ORIGINATING USER DEVICE TO USE CONTACT INFORMATION IN A PRIORITIZED LIST TO CONTACT A DESTINATION USER DEVICE

CROSS-REFERENCE TO RELATED APPLICATIONS

This application is a continuation of U.S. patent application Ser. No. 10/723,978, filed Nov. 26, 2003, the entire contents of which are herein incorporated by reference.

FIELD OF THE INVENTION

The present invention relates to communications, and in particular to allowing an originating user to identify contact information corresponding to the best way to communicate with another user.

BACKGROUND OF THE INVENTION

With the proliferation of different types of communication methods, it is growing more difficult to determine the best way to communicate with another. Telephony users are often associated with multiple telephony numbers, email addresses, instant messaging IDs, and pagers, just to name a few of the ways to communicate with users. In light of these different possible communication techniques, a person may have to initiate numerous calls, leave multiple voicemails, as well as send text messages, before successfully contacting or communicating with the intended user. If only voicemails or text messages are left, the contacted user may go through similar steps to return a call or respond to a voice or text message.

In an effort to make contacting users more efficient, presence systems are being developed that attempt to derive information indicative of the availability of a user and the best way to communicate with the user. These presence systems generally receive information from the user or from the user's communication devices to determine the best way to communicate with the user. Unfortunately, these systems are embryonic in their development, and have failed to present an effective way in which the user originating communications can access the presence information and initiate communications based thereon. Further, depending on the relative importance of the communication, whether the communication is for personal or business reasons, or based on a relative time and date, different types of communications may be desired by the originating user in different circumstances and at different times. Accordingly, there is a further need to provide the originator of communications a list of available communication techniques for communicating with the destination user, and perhaps, a priority in which these communication techniques should be used in light of the desires of the originating user and the destination user.

SUMMARY OF THE INVENTION

The present invention provides an originating user with a prioritized list of communication contacts associated with the various communication devices of a destination user, wherein the originating user will initiate communications with the destination user using one of the communication contacts provided in the prioritized list of communication contacts. Upon selecting a destination user, a request is sent to a service node, which includes rules for establishing the prioritized list of communication contacts based on various prioritization criteria. The prioritization criteria may include static information and dynamic information, such as time, day of the week, and date, as well as presence information bearing on the availability or location of the destination user. Based on the particular rules provided by the destination user, the prioritized list of communication contacts will be provided to the originating user upon receiving a request from the originating user. Information may be provided in the request corresponding to the originating user, the type of communication desired by the originating user, the relative priority of the communication, among other information. The prioritized list of communication contacts may be further based on information from the originating user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIGS. 2A and 2B provide a communication flow outlining the operation of an exemplary communication scenario according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows an originating user to effectively determine a more appropriate way to communicate with a destination user in an efficient and effective manner. A service node will keep track of presence information for a destination user based on predefined rules, status information, or other information indicative of an appropriate way to communicate with the destination user, and use this presence information to provide the originating user with a prioritized list of communication contacts, which may be used to initiate communications with the destination user. When the originating user initiates communications from a multimedia client, a request is sent directly or indirectly to the service node to retrieve the prioritized list of communication contacts. The prioritized list of communication contacts may vary based on the presence information of the destination user, as well as the originating user, the relative priority of the communication, the type of communication, or other relevant information that the service node may use in creating the prioritized list of communication contacts. Depending on the capabilities of the multimedia client, various types of communications may be initiated from the multimedia client or by controlling another communication device, directly or indirectly via an associated service node. Thus, the multimedia client can simply provide the originating user a list of destination users, and when the contact icon for the desired destination user is selected, the prioritized list of communication contacts for that destination user is automatically retrieved and may be used to initiate a subsequent communication using the selected communication contact.

Figure 1:
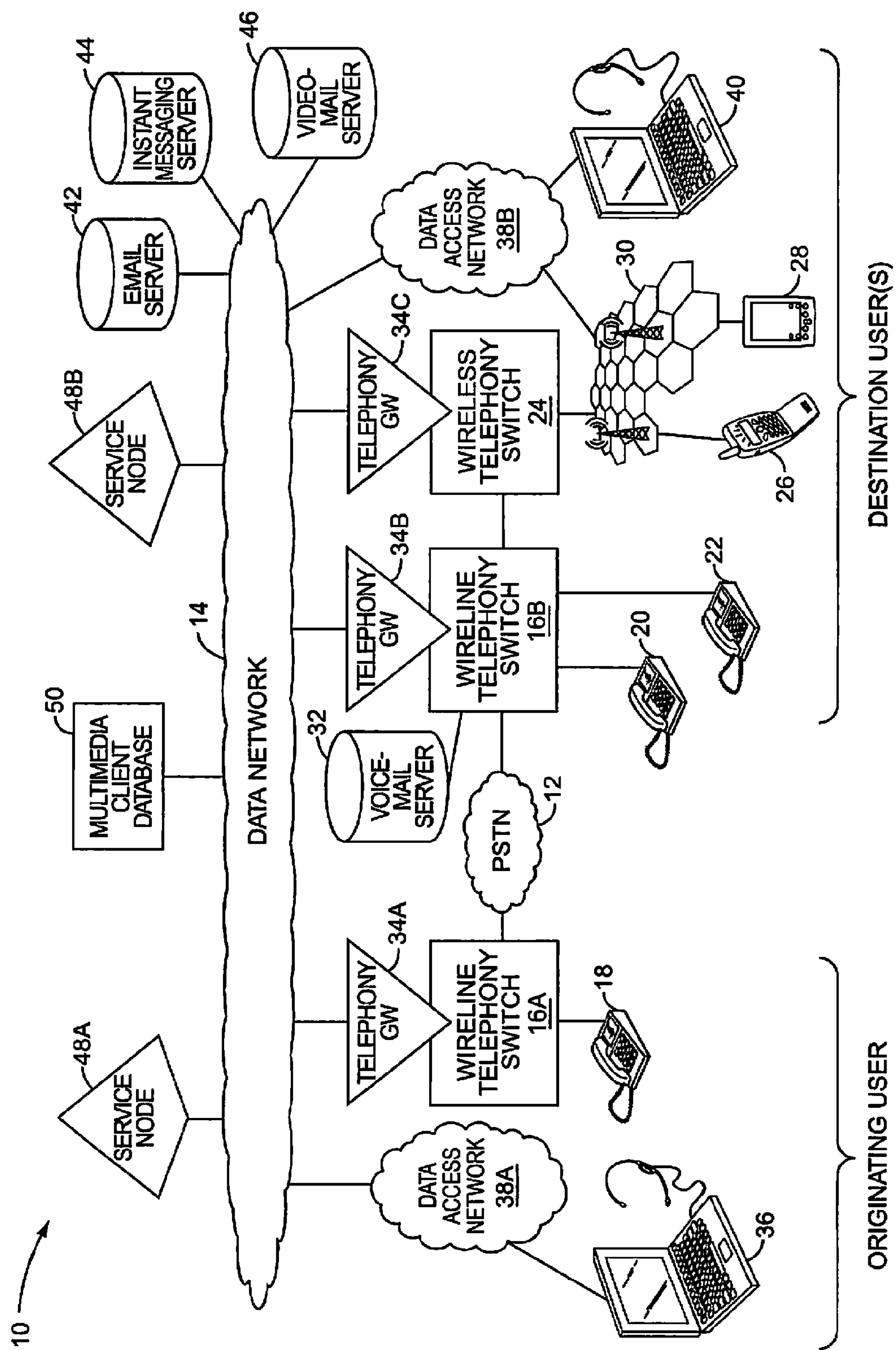

Prior to delving into the details of the present invention, an overview of an exemplary communication environment 10 is illustrated in FIG. 1. The communication environment 10 is centered around a Public Switched Telephone Network (PSTN) 12 and a packet-based data network 14. The PSTN 12 is associated with multiple wireline telephony switches 16 (A and B) capable of supporting circuit-switched communications. As illustrated, wireline telephony switch 16A may support a wireline telephony terminal 18, which is associated with an originating user, and wireline telephony switch 16B may support wireline telephony terminals 20 and 22, which are associated with one or more destination users. For the purposes of illustration, the originating user desires to initiate communications with one or more destination users.

For wireless communications, a wireless telephony switch 24, which is part of a cellular network, may be directly or indirectly coupled to the PSTN 12 and may support cellular communications with mobile clients, such as a mobile terminal 26 and a mobile personal digital assistant (PDA) 28 via a cellular network of base stations 30. A voicemail server 32 may be associated with wireline telephony switch 16B or the wireless telephony switch 24. Interworking between the PSTN 12, wireline telephony switches 16, and wireless telephony switches 24 and the data network 14 may be facilitated via one or more telephony gateways (GWs) 34 (A, B, and C). In addition to telephony terminal 18, the originating user may also have a multimedia client 36, such as a personal computer, which is capable of communicating over the data network 14 via a data access network 38A. Similarly, the destination user may have a multimedia client 40 capable of communicating over the data network 14 via a data access network 38B.

The multimedia clients 36, 40 will be able to initiate and conduct communications using various communication techniques. The multimedia clients 36 and 40 may have varying degrees of capabilities depending on implementation, but may facilitate voice sessions using Voice over Packet (VoP) technology, instant messaging, Short Message Service (SMS), Multimedia Message Service (MMS) (via a cellular network), email, videomail, or other audio, visual, or text communications. Further, certain embodiments will allow a media session involving multimedia client 36 to be associated with a telephony call facilitated via wireline telephony terminal 18. Multimedia client 40 may have similar capabilities with wireline telephony terminals 20, 22, mobile terminal 26, or PDA 28. The data network 14 may also support various communication servers, such as an email server 42, instant messaging (IM) server 44, and videomail server 46, wherein the respective servers will support email, instant messaging, and video conferencing or video storage for subsequent delivery or playback.

As noted, the destination user is associated with multiple communication devices, and when the originating user wants to contact the destination user, the present invention provides the originating user with a prioritized list of communication contacts for the destination user. To facilitate this service, one or more service nodes 48 (A and B) and optionally, a multimedia client database 50, are provided. The prioritized list of communication contacts for the destination user is generated by service node 48B, which supports the destination user. In operation, the multimedia client 36 for the originating user will generate a request for the prioritized list of communication contacts when the originating user provides an indication that the destination user is to be contacted. The request is sent to the service node 48A that supports the originating user. Service node 48A will then identify the service node 48B that supports the destination user, and form the request to supporting service node 48B. The requested list is then generated and fed back to multimedia client 36 via service node 48A.

The prioritized list of communication contacts may be based on any combination of static and dynamic variables. Depending on the sophistication of the presence system implemented by the service node 48B supporting the destination user, the destination user may provide a static order in which to prioritize communications directed to her. For example, the static list may indicate a priority as follows: wireline telephony terminal 22, email, mobile terminal 26, instant messaging, and wireline telephony terminal 20. The order of priority may change based on time, date, day of the week, identity of the originating user, and the like. Further, certain communication contacts may not be available based on any of the list of variables. Accordingly, the destination user can provide a profile, which dictates how the prioritized list of communication contacts can be created.

In more sophisticated embodiments, presence information may be received from the destination user, from one or more of the communication devices associated with the destination user, or a combination thereof, to provide service node 48B with a more accurate picture of the user's relative availability and location. Based on the availability, location, or a combination thereof, service node 48B will process this information in light of the destination user's profile to create the prioritized list of communication contacts. In addition to the presence information, the static information described above may also be taken into consideration to further customize the prioritization of the communication list. For static or dynamic embodiments, the destination user's profile may also take into consideration information provided in the request for the prioritized list. For example, the request may include the identity of the originating user, the relative urgency of the call, the type of call (personal or business), the originating user's preferred communication technique, and the like, to further control how the prioritized list of communication contacts is created.

In one embodiment, the prioritized list of communication contacts either is or includes the associated communication addresses that are associated with the communication contacts. The communication addresses may be Uniform (or Universal) Resource Locators (URLs), directory numbers, Internet Protocol (IP) addresses, Session Initiation Protocol (SIP) addresses, or any other circuit-switched or packet-based addressing indicia. Since the communication addresses are provided in the prioritized list of communication contacts, they may be used by the multimedia client 36 of the originating user to initiate, directly or indirectly, a communication to the destination user. In other embodiments, multimedia client 36 may be able to take an identifier of the communication contact and access a communication address for the communication contact.

For additional information on collecting and disseminating presence and related information, attention is directed to co-assigned U.S. patent application Ser. No. 10/079,237 filed Feb. 20, 2002 entitled TELEPHONY USAGE DERIVED PRESENCE INFORMATION, Ser. No. 10/100,703 filed Mar. 19, 2002 entitled MONITORING NATURAL INTERACTION FOR PRESENCE DETECTION; 10/101,286 filed Mar. 19, 2002 entitled CUSTOMIZED PRESENCE INFORMATION DELIVERY; Ser. No. 10/119,923 filed Apr. 10, 2002 entitled PRESENCE INFORMATION BASED ON MEDIA ACTIVITY; Ser. No. 10/119,783 filed Apr. 10, 2002 entitled PRESENCE INFORMATION SPECIFYING COMMUNICATION PREFERENCES; Ser. No. 10/247,591 filed Sep. 19, 2002 entitled DYNAMIC PRESENCE INDICATORS; and Ser. No. 10/331,706 filed Dec. 30, 2002 entitled PRESENCE ENABLED QUEUE MANAGEMENT, the disclosures of which are incorporated herein by reference in their entireties. For additional information regarding the interaction between multimedia clients 36 and 40, attention is directed to co-assigned U.S. patent application Ser. No. 10/006,942 filed Dec. 4, 2001 entitled COMPOSITE USER AGENT; and Ser. No. 10/036,247 filed Dec. 27, 2001 entitled PERSONAL USER AGENT, the disclosures of which are incorporated herein by reference in their entireties.

Figure 2A:
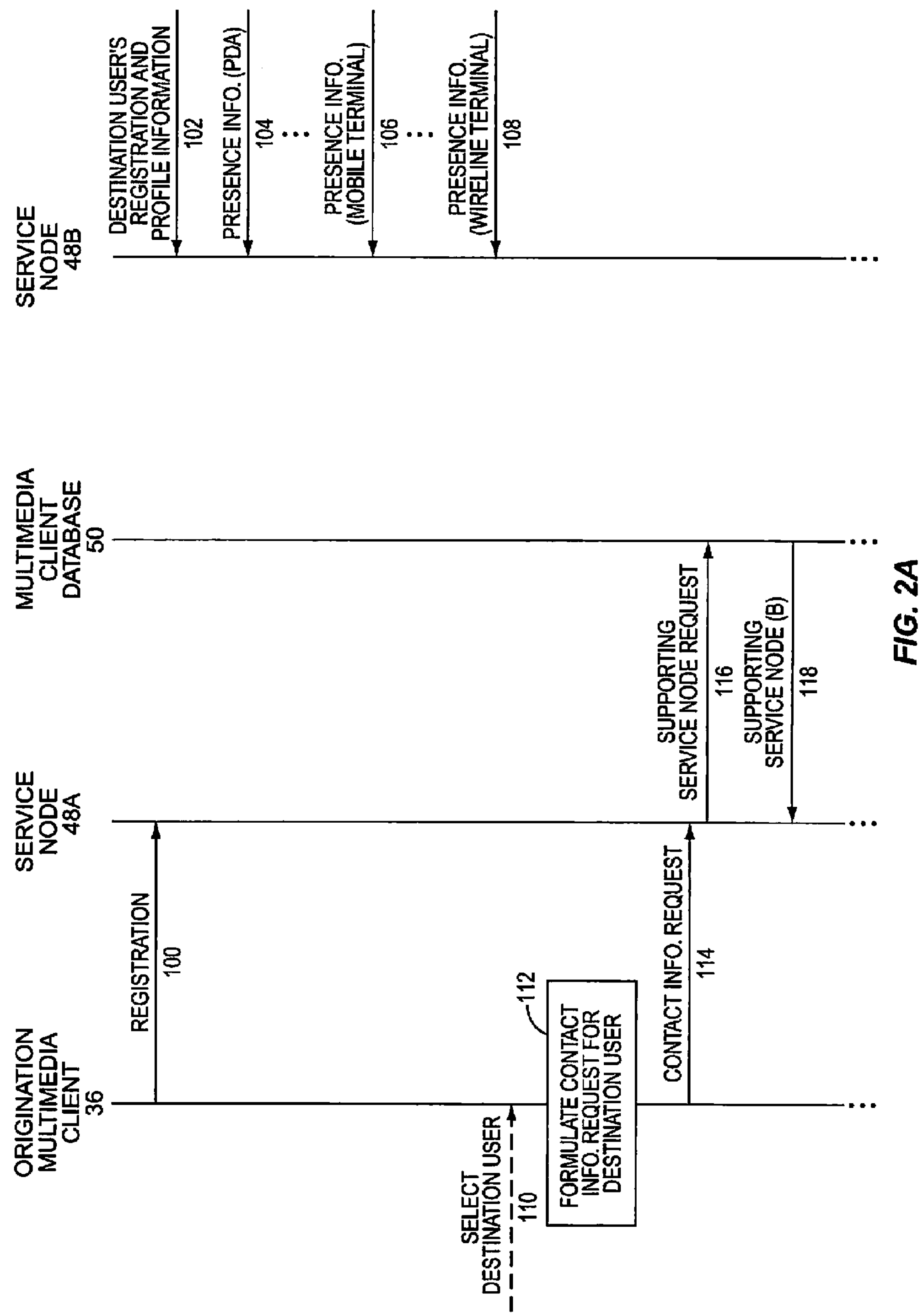
Figure 2B:
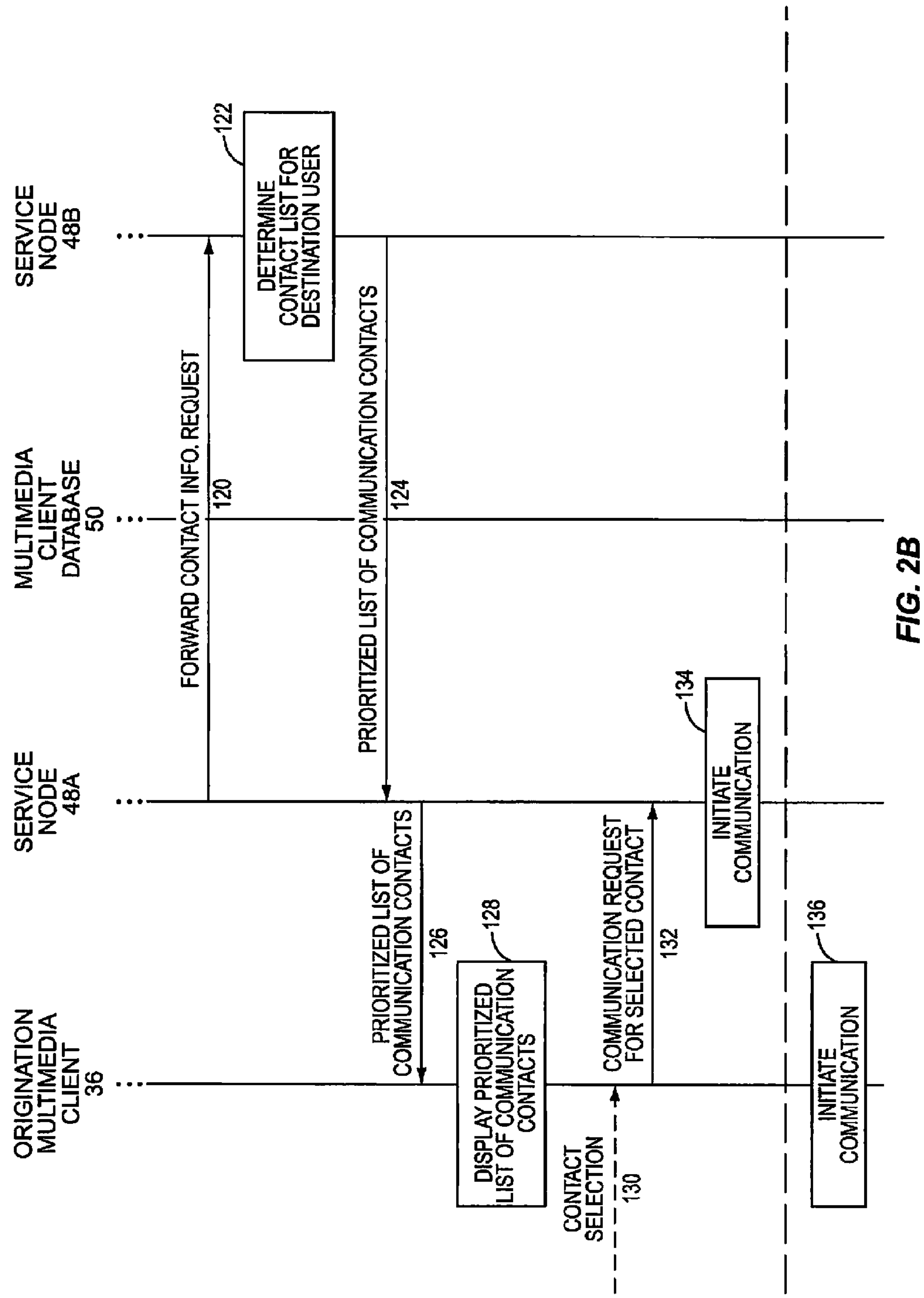

Turning now to FIGS. 2A and 2B, an exemplary communication flow is illustrated according to one embodiment of the present invention. Initially, assume that originating multimedia client 36 registers with its supporting service node 48A (step 100). The registration process may provide the information for the originating user, multimedia client 36, and any associated communication devices for the originating user. Also assume that the destination user has registered at supporting service node 48B, and provided the necessary information to configure the destination user's profile (step 102). At this point, service node 48B will have a profile established for the destination user. The registration and profile information will include the various communication devices for the destination user and the necessary information to create a prioritized list of communication contacts, which may include the communication addresses for the various communication devices. In the illustrated embodiment, service node 48B is configured to receive presence information corresponding to the relative availability or location of the destination user. For example, as the destination user moves from one location to another or chooses to use different communication devices from time to time, the presence information will be provided to service node 48B corresponding to such usage. In this example, presence information from the PDA 28 is initially provided to service node 48B to indicate that the destination user is using the PDA 28 (step 104). Next, presence information is received indicating the destination user is using the mobile terminal 26 (step 106), and finally, presence information is received indicating the destination user is using the wireline terminal 22 (step 108). As such, service node 48B will have the most recent availability or location based presence information for the destination user.

When the originating user needs to contact the destination user, she may access multimedia client 36 and select the destination user from a list of contacts (step 110). The selected contact is not a specific communication device or address for the destination user, but merely the destination user's identity. From the destination user's identity, the multimedia client 36 for the originating user will formulate a contact information request for the selected destination user (step 112). The contact information request is then sent to supporting service node 48A (step 114), which will determine whether it supports the destination user or needs to determine the identity of a service node that supports the destination user. In this embodiment, assume that service node 48B supports the destination user. As such, service node 48A supporting the originating user may access the multimedia client database 50 using the identity of the destination user to request the identity of the service node supporting the destination user (step 116). The multimedia client database 50 will access the identity of service node 48B and provide it to service node 48A (step 118). At this point, service node 48A supporting the originating user will forward the contact information request to service node 48B supporting the destination user (step 120). The service node 48B supporting the destination user will generate a prioritized contact list for the destination user based on static information, dynamic information, including information provided in the request, or a combination thereof in light of the destination user's profile (step 122), and provide the prioritized list of communication contacts to service node 48A (step 124), which will forward the prioritized list of communication contacts to origination multimedia client 36 (step 126).

Once the prioritized list of communication contacts is received, the multimedia client 36 for the originating user may display the prioritized list of communication contacts to the originating user (step 128), who will select from the prioritized list of communication contacts to initiate communication with the destination user. If the multimedia client 36 for the originating user is capable of initiating the type of communication desired by the destination user, the originating user may input a contact selection to multimedia client 36 (step 130), which will take the necessary steps to initiate the communication, be it an email, instant message, or telephone call. For example, service node 48A may be configured to initiate such communications, and as such, multimedia client 36 will send a communication request for the selected contact to service node 48A (step 132), which will initiate the communication (step 134). Alternatively, multimedia client 36 may be able to initiate the communication directly (step 136), such as initiating a packet-based telephony session, email, instant messaging session, or other communication session. In a less complex embodiment, the user may simply take the contact address associated with the selected communication contact and manually initiate the communication session.

Figure 3:
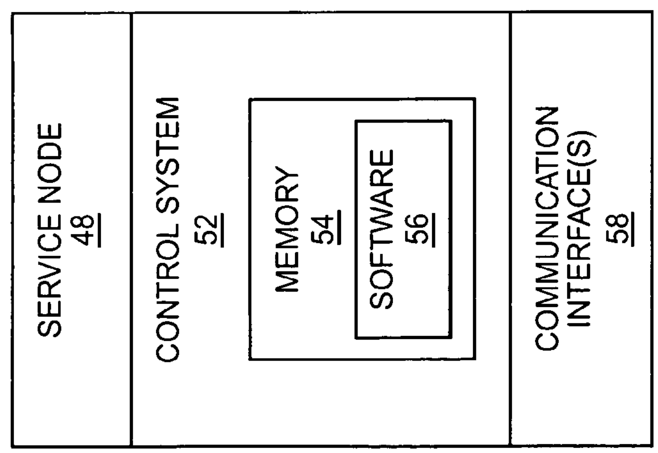
FIG. 3 is a block representation of a service node according to one embodiment of the present invention.

A block representation of a service node 48 according to one embodiment of the present invention is illustrated in FIG. 3. The service node 48 will include a control system 52 having memory 54 sufficient to store software 56 capable of implementing the functionality described above. The control system 52 will also be associated with one or more communication interfaces 58 to facilitate communications with the multimedia clients 36, 40, other service nodes 48, the multimedia client database 50, and any other telephony or communication devices, such as the wireline telephony switches 16 and wireless telephony switch 24, to gather presence information, receive requests for prioritized lists, for those requests, and create prioritized lists of communication contacts. Those skilled in the art will recognize other functionalities supported by the service nodes 48 to effectively and efficiently implement the present invention.

Figure 4:
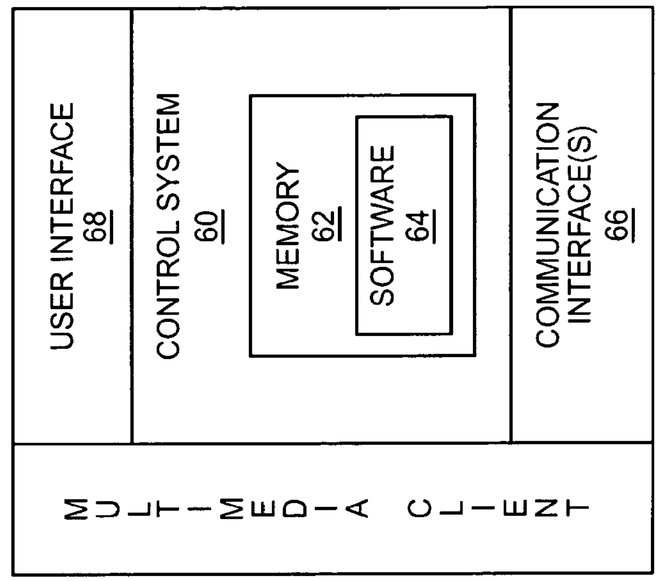
FIG. 4 is a block representation of a multimedia client according to one embodiment of the present invention.

A block representation of a generic multimedia client, such as multimedia client 36 or 40, is illustrated in FIG. 4. The multimedia client may take the form of any type of personal computing device ranging from a personal digital assistant to a desktop personal computer, and will generally include a control system 60 with memory 62 sufficient to store software 64, which is capable of implementing the functionality described above. The control system 60 will be associated with one or more communication interfaces 66 to communicate directly or indirectly with the service node 48 and any other communication devices.

Those skilled in the art will recognize improvements and modifications to the preferred embodiments of the present invention. All such improvements and modifications are considered within the scope of the concepts disclosed herein and the claims that follow.

What is claimed is:

1. A method comprising:

a multimedia client transmitting a request to initiate communications with a destination user from an originating user device attempting to initiate communications with the destination user, wherein the request is generated at the multimedia client;

the multimedia client receiving a prioritized list of communication methods for communicating with the destination user, wherein the prioritized list is based at least in part on one of more of a time of the request, a date of the request, or a day of the week of the request, and wherein the communication methods are associated with devices usable to communicate with the destination user;

upon receipt of the prioritized list of communication methods, the multimedia client receiving user input selecting one of the communication methods in the prioritized list of communication contacts; and the multimedia client transmitting a request to initiate communications with the destination user using the selected communication method.

2. The method of claim 1, wherein, in response to the request to initiate communications with the destination user, a service node is configured to create the prioritized list of communication methods.

3. The method of claim 1, wherein said transmitting is performed in response to receiving user input selecting the destination user in a user interface of the multimedia client.

4. The method of claim 1, wherein the prioritized list is created based on rules received from the destination user.

5. The method of claim 1, wherein the prioritized list of communication methods is created in a dynamic fashion.

6. The method of claim 1, wherein the prioritized list of communication methods is based on an availability or location of the destination user.

7. The method of claim 1, wherein the prioritized list of communication methods is based on at least one of time, date, or day of week.

8. A system, comprising:

communication circuitry, wherein the communication circuitry is configured to communicate with at least a communication network; and processing hardware coupled to the communication circuitry, wherein the processing hardware and the communication circuitry are configured to operate together to:

register an originating user device with a service node, wherein the registering includes transmitting profile information associated with the originating user device;

transmit a request to the service node to initiate communications with a destination user from the originating user device, wherein the request is generated at a multimedia client of the originating user device;

receive a prioritized list of communication methods for communicating with the destination user device, wherein the prioritized list is based at least in part on one of more of a time of the request, a date of the request, or a day of the week of the request, and wherein the communication methods are associated with ways of communicating with the destination user;

upon receipt of the prioritized list of communication methods, receiving user input selecting one of the communication methods in the prioritized list of communication contacts; and in response to receiving the user input, transmitting a request to initiate communications with the destination user using the selected communication method.

9. The system of claim 8, wherein, in response to the request to initiate communications with the destination user, a service node is configured to create the prioritized list of communication methods.

10. The system of claim 8, wherein said transmitting is performed in response to receiving user input selecting the destination user in a user interface of the system.

11. The system of claim 8, wherein the prioritized list is created based on rules received from the destination user.

12. The system of claim 8, wherein the prioritized list of communication methods is created in a dynamic fashion.

13. The system of claim 8, wherein the prioritized list of communication methods is based on an availability or location of the destination user.

14. The system of claim 8, wherein the prioritized list of communication methods is based on at least one of time, date, or day of week.

15. A non-transitory, computer accessible memory medium storing program instructions executable by a processor of a multimedia client to:

transmit a request to initiate communications with a destination user, wherein the destination user is associated with a plurality of destination user devices, from an originating user device attempting to initiate communications with the destination user, wherein the request is generated at the originating user device;

receive a prioritized list of communication methods for communicating with the destination user, wherein the prioritized list is based at least in part on one of more of a time of the request, a date of the request, or a day of the week of the request, and wherein the communication methods are associated with ways of communicating with the destination user at the plurality of destination user devices;

upon receipt of the prioritized list of communication methods, receive user input selecting one of the communication methods corresponding to one of the plurality of destination user devices in the prioritized list of communication contacts; and transmit a request to initiate communications with the destination user device using the selected communication method.

16. The non-transitory, computer accessible memory medium of claim 15, wherein, in response to the request to initiate communications with the destination user device, a service node is configured to create the prioritized list of communication methods.

17. The non-transitory, computer accessible memory medium of claim 15, wherein said transmitting is performed in response to receiving user input selecting the destination user device in a user interface of the multimedia client.

18. The non-transitory, computer accessible memory medium of claim 15, wherein the prioritized list is created based on rules received from the destination user.

19. The non-transitory, computer accessible memory medium of claim 15, wherein the prioritized list of communication methods is created in a dynamic fashion.

20. The non-transitory, computer accessible memory medium of claim 15, wherein the prioritized list of communication methods is based on an availability or location of the destination user.

* * * * *